United States Patent [19]

Okita et al.

[11] Patent Number: 5,231,894
[45] Date of Patent: Aug. 3, 1993

[54] STRUCTURE OF ENGINE UNIT FOR VEHICLE

[75] Inventors: Junichi Okita; Osamu Kameda; Sakumi Hasetoh; Ichiro Hirose; Yoshimichi Tanaka; Hitoshi Akutagawa, all of Hiroshima, Japan

[73] Assignee: Mazda Motor Corporation, Hiroshima, Japan

[21] Appl. No.: 843,186

[22] Filed: Feb. 28, 1992

[51] Int. Cl.$^5$ .............................. F16H 57/02
[52] U.S. Cl. ........................ 74/606 R; 74/606 A; 123/195 C; 123/196 R
[58] Field of Search ............... 74/606 R, 606 A, 605; 123/195 C, 196 R; 180/292

[56] References Cited

U.S. PATENT DOCUMENTS

| | | | |
|---|---|---|---|
| 4,770,276 | 9/1988 | Takubo | 123/195 C X |
| 4,915,070 | 4/1990 | Okui | 74/606 R |
| 4,966,106 | 10/1990 | Aruga et al. | 123/195 C X |
| 5,000,142 | 3/1991 | Aruga et al. | 123/195 C |
| 5,007,307 | 4/1991 | Tamazawa et al. | 74/606 R |
| 5,014,659 | 5/1991 | Ohshima et al. | 123/195 C |
| 5,014,812 | 5/1991 | Kazama | 123/195 C X |
| 5,107,808 | 4/1992 | Mahn et al. | 123/196 R X |
| 5,148,784 | 9/1992 | Hiraoka et al. | 123/195 C |

FOREIGN PATENT DOCUMENTS

| | | | |
|---|---|---|---|
| 3838073 | 5/1990 | Fed. Rep. of Germany | 74/606 R |
| 1316559 | 7/1989 | Japan | 74/606 R |
| 2074645 | 11/1981 | United Kingdom | 123/195 C |

*Primary Examiner*—Vinh T. Luong
*Attorney, Agent, or Firm*—Sixbey, Friedman, Leedom & Ferguson

[57] ABSTRACT

An engine unit includes an engine and a power train having a transmission and the engine unit is mounted sideways on a vehicle body with the power train positioned rearward of the engine. The engine and the power train are housed in a single engine housing and an oil pan common to the engine and the power train is mounted on the lower side of the engine housing below the engine and the power train. The length of the oil pan in the transverse direction of the vehicle body is smaller than the engine housing and auxiliary mechanisms are disposed in the space on one side of the oil pan and below the engine housing.

14 Claims, 11 Drawing Sheets

STRUCTURE OF ENGINE UNIT FOR VEHICLE

BACKGROUND OF THE INVENTION

1. Field of the Invention

This invention relates to a structure of an engine unit for a vehicle including an engine and a power train.

2. Description of the Prior Art

It has been known to mount an engine body sideways on a vehicle body so that the crankshaft extends in the transverse direction of the vehicle body and to mount a transmission and a differential in parallel to the crankshaft. (See, for instance, Japanese Unexamined Patent Publication No. 1(1989)-31655 and U.S. Pat. No. 4,915,070).

In an automotive engine, auxiliary mechanisms which are relatively small in size and give relatively light load to the engine such as an oil pump for lubricating the engine and a water pump are generally disposed on the front end of the engine and connected to the crankshaft directly or by way of gears, while those which give relatively heavy load to the engine such as a pump for a power steering and an alternator are generally disposed on a side of the engine near the front or rear end of the engine and driven by the crankshaft by way of a belt or chain. For example, an engine disclosed in West German Patent No. 3838073 is mounted sideways on the vehicle body with a transmission disposed in parallel to the engine and is slanted rearward, and auxiliary mechanisms are disposed in a space produced by the rearward slant of the engine and are driven by the crankshaft by way of a belt.

By the way, also in a front-engine front-drive vehicle where the engine is mounted sideways, the transmission is generally mounted in series with the engine body, and accordingly, an oil pan is required for each of the engine body and the transmission (the power train), which complicates the structure of the engine unit and increases the amount of oil required. This problem cannot be overcome even with the structure disclosed in Japanese Unexamined Patent Publication No. 1(1989)-316559 where the transmission is disposed in parallel to the crankshaft of the engine in order to reduce the sum of the lengths of the crankshaft and the transmission in the transverse direction of the vehicle body.

That is, oil should be stored in the oil pan in an amount sufficient to prevent the oil level from falling below the oil strainer when the vehicle makes a sudden start, sudden stop or sharp turn, and accordingly, a large amount of oil must be stored in both the oil pans for the engine and the transmission. When the oil pan is formed by deep draw or a baffle plate is provided in the bottom of the oil pan, production of the oil pan is complicated and production cost is increased.

There has been a demand for mounting auxiliary mechanisms in a space on the front side or the rear side of the oil pan which is a relatively dead space. However an attempt to dispose the auxiliary mechanism in such a space involves a problem that the part for mounting the auxiliary mechanism must be reinforced in order to ensure bearing rigidity for belt tension and a space for passing the auxiliary mechanism driving shaft which is connected to the crankshaft must be provided, which results in reduction of the volume of the oil pan and failure in ensuring the amount of oil. Thus the conventional arts have failed in sufficiently utilizing the dead spaces on the front and rear side of the oil pan in disposing the auxiliary mechanisms.

Further the engine body is sometimes slanted in one direction relative to the vertical plane passing through the crankshaft of the engine in view of layout in the engine room. In such a case, the center of gravity of the engine body can be off-centered or shifted upward, which can be enhanced depending on the arrangement of the auxiliary mechanisms to cause rolling of the vehicle body.

Further when the power train is disposed behind the engine, the transmission cannot be sufficiently cooled by airflow during running and an external oil cooler for cooling the transmission oil comes to be necessary, which is undesirable in view of space, cost and weight.

SUMMARY OF THE INVENTION

In view of the foregoing observations and description, the primary object of the present invention is to provide a structure of an engine unit in which the amount of oil required can be reduced without complicating the structure of the oil pan.

Another object of the present invention is to provide a structure of an engine unit in which the transmission which is disposed behind the engine can be effectively cooled by airflow generated by running of the vehicle.

Still another object of the present invention is to provide a structure of an engine unit in which belts or chains for driving the main mechanisms and the auxiliary mechanisms can be compactly laid out.

Still another embodiment of the present invention is to provide a structure of an engine unit which permits to lower the engine hood line without substantially increasing the size of the engine unit in the longitudinal direction of the vehicle body.

The engine unit in accordance with the present invention includes an engine and a power train having a transmission and the engine unit is mounted sideways on a vehicle body with the power train positioned rearward of the engine. The engine and the power train are housed in a single engine housing and an oil pan common to the engine and the power train is mounted on the lower side of the engine housing below the engine and the power train. The length of the oil pan in the transverse direction of the vehicle body is smaller than the engine housing and auxiliary mechanisms are disposed in the space on one side of the oil pan and below the engine housing.

In accordance with the present invention, since the oil pan is common to the engine and the power train, the overall amount of oil required is reduced even if oil is stored in the oil pan in an amount sufficient to prevent the oil level from falling below the oil strainer when the vehicle makes a sudden start, sudden stop or sharp turn, and at the same time, the number of parts required is reduced and the engine unit can be simplified in structure.

When the oil pan is disposed substantially at the middle between the engine and the power train, fluctuation of the oil level during sharp turn or the like can be suppressed and accordingly the amount of oil may be smaller.

Further since the oil pan is smaller than engine housing in the size in the transverse direction of the vehicle body, airflow which is generated during running of the vehicle can impinge upon the transmission behind the engine to effectively cool it.

Further, by disposing the auxiliary mechanisms in the space on one side of the oil pan and below the engine housing, the auxiliary mechanisms can be compactly laid out.

DESCRIPTION OF THE PREFERRED EMBODIMENTS

Figure 1:
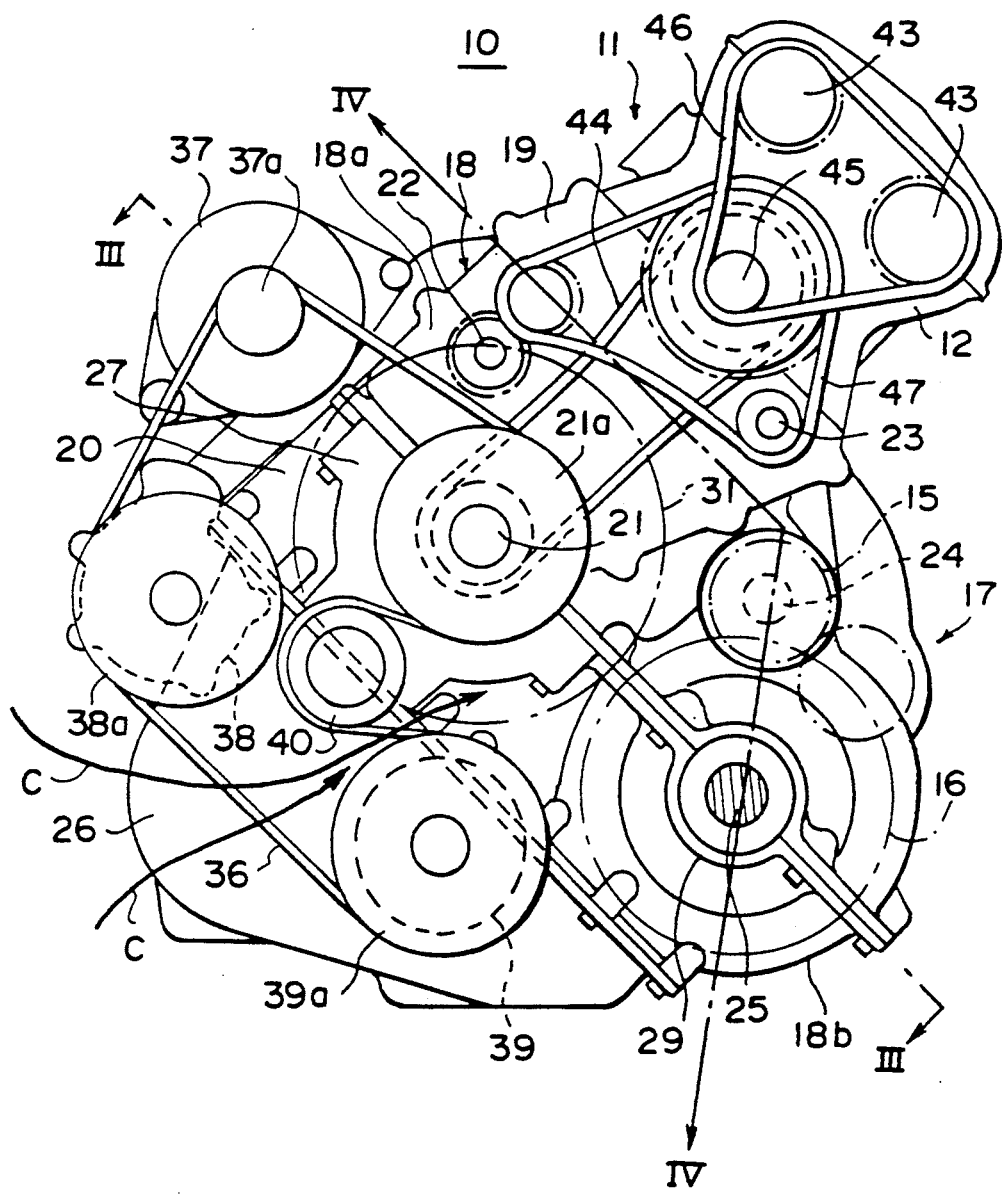
FIG. 1 is a schematic side view of an engine unit in accordance with a first embodiment of the present invention.

In FIGS. 1 to 4, an engine unit 10 in accordance with a first embodiment of the present invention is mounted sideways in the front of a vehicle body (not shown) with the left side in FIG. 1 facing forward and drives the front wheels (not shown) of the vehicle. The engine unit 10 includes a four-cylinder inline engine 11 having a cylinder head 12 and a power train 17 comprising a transmission 15 and a differential 16. The engine 11 and the power train 17 are housed in one engine housing 18. The engine 11 has a crankshaft 21 extending in the transverse direction of the vehicle body and the upper portion of the engine 11 is slanted rearward of the vehicle body (rightward as seen in FIG. 1). A pair of balancer shafts 22 and 23 for suppressing vibration of the engine 11 are mounted on an upper portion of the engine housing 18 spaced from each other in the longitudinal direction of the vehicle body. A transmission shaft 24 and drive shafts (differential shafts) 25 which extend in opposite directions from the differential 16 are disposed in parallel to the crankshaft 21 on the rear side of the engine 11.

The engine housing 18 comprises a crank casing portion 18a which forms a cylinder block portion of the engine 11 and a transmission casing portion 18b for housing the power train 17. The transmission casing portion 18b is positioned lower than the crank casing portion 18a. The engine housing 18 is linearly divided into a main housing 19 and a lower housing 20 along a plane passing through the axis of the crankshaft 21. An oil pan 26 is mounted on the lower side of the lower housing 20. Bearing portions 27 for supporting the crankshaft 21 are formed in the mating surfaces of the main housing 19 and the lower housing 20. Further, bearing portions 29 for supporting the drive shafts 25 are formed in the mating surfaces of the main housing 19 and the lower housing 20 on the rear side of the bearing portions 27.

Figure 3:
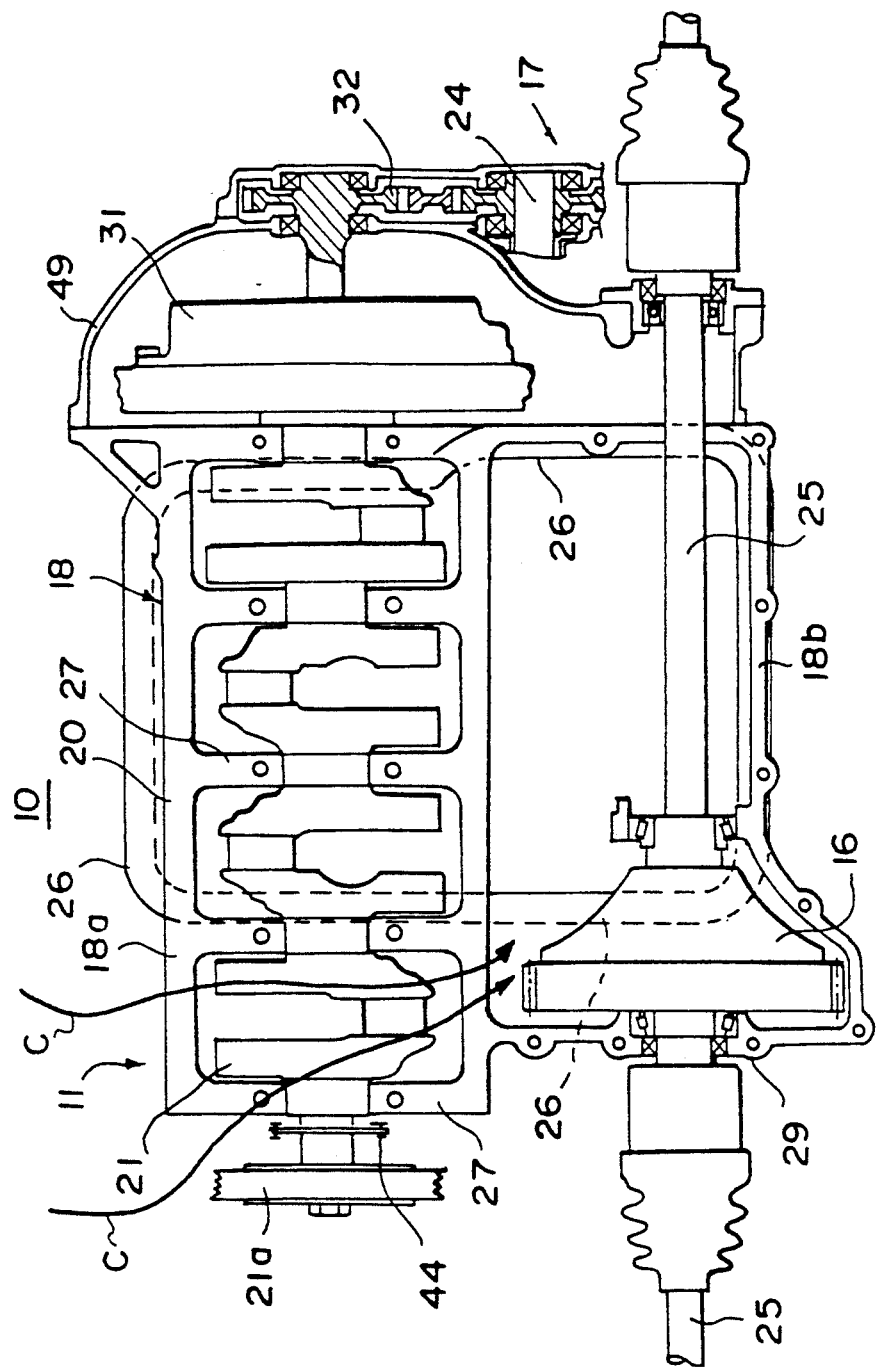
FIG. 3 is a cross-sectional view taken along line III—III in FIG. 1 with the auxiliary mechanism removed.
Figure 4:
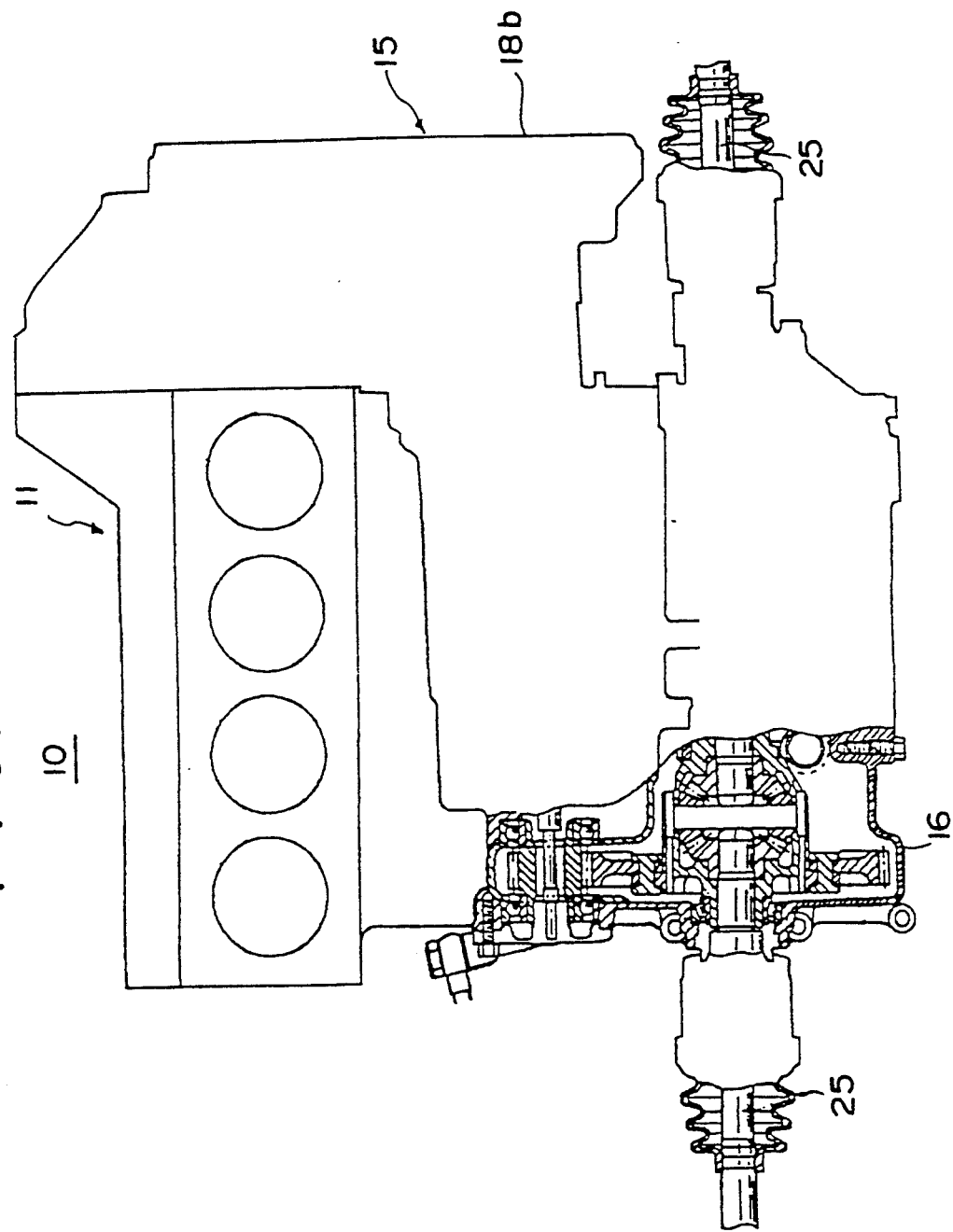
FIG. 4 is a cross-sectional view, partly abbreviated, taken along line IV—IV in FIG. 1.

A clutch 31 is mounted on an extension of the crankshaft 21 on one end of the engine 11 and the output of the clutch 31 is input into the transmission shaft 24 by way of a gear 32 (FIG. 3). The output of the transmission shaft 24 is transmitted through the differential 16 to the drive shafts 25 which extend from the differential 16 in the transverse direction of the vehicle body on the rear lower side of the engine 11.

If the rear wheels are to be driven in addition to the front wheels, a center differential is provided adjacent to the differential 16 and a propeller shaft which extends rearward is connected to the center differential by way of a transfer.

The oil pan 26 is disposed substantially at the middle between the engine 11 and the power train 17. In the longitudinal direction of the vehicle body, the oil pan 26 extends from the bottom of the engine 11 (cylinder block) to the bottom of the power train 17 near the drive shafts 25. In the transverse direction of the vehicle body, the oil pan 26 is smaller than the engine housing 18 in length and is disposed off-centered toward the clutch 31, whereby a space S is formed below the lower housing 20 on the end of the oil pan 26 remote from the clutch 31 and the transmission casing portion 18b extends beyond the end of the oil pan 26 in the transverse direction of the vehicle body. Further the oil pan 26 is fixed to the lower side of the lower housing 20 along an inclined surface and the bottom of the oil pan 26 is deep at the forward portion and shallow at the rearward portion.

The upper surface of the lower housing 20 comprises the crank casing portion 18a in which the bearing portions 27 for supporting the crankshaft 21 at opposite ends and the portions between the cylinders are formed and the transmission casing portion 18b which surrounds the lower portion of the gear train of the transmission 15 and the lower portion of the differential 16, the portions 18a and 18b being formed integrally with each other. Further the lower housing 20 is provided on the lower side thereof with an opening which is smaller than the opening in the upper surface and conforms to the upper surface of the oil pan 26 in shape.

The engine unit 10 is provided with auxiliary mechanisms which are mainly disposed in said space S on the side of the oil pan 26 remote from the clutch 31 and are driven by a belt 36 passed around a crank pulley 21a. That is, an alternator 37 is disposed on the upper front side of the engine housing 18 and a water pump 38 is disposed on the lower front side of the engine housing 18. Further an air conditioner compressor 39 is disposed below the engine housing 18 at the middle thereof. The alternator 37, the water pump 38 and the air conditioner compressor 39 respectively have pulleys 37a, 38a and 39a and the belt 36 is passed around the crank pulley 21a, pulleys 37a to 39a and an idler pulley 40 disposed between the crankshaft 21 and the air conditioner compressor 39. The auxiliary mechanisms 37, 38 and 39 and the differential 16 are disposed on a circle about the crankshaft 21. A water pipe 41 for feeding cooling water is connected between the water pump 38 and an upper portion of the engine housing 18 (cylinder block) of the engine 11.

As can be seen from FIG. 1, the auxiliary mechanisms 37, 38 and 39 are positioned below the mating face of the engine housing 18 while the camshaft 43, the balancer shafts 22 and 23, and the like are positioned above the mating face. Further the auxiliary mechanisms 37, 38 and 39 are positioned on the side of the engine 11 opposite to the power trains 17, that is, positioned on the front side of the engine 11.

A pair of camshafts 43 are disposed in an upper portion of the cylinder head 12. The camshafts 43 and the balancer shafts 22 and 23 are driven in the following manner. That is, an intermediate shaft 45 is driven by the crankshaft 21 by way of a first chain 44, and the camshafts 43 are driven by the intermediate shaft 45 at a reduced speed by way of a second chain 46. Further the balancer shafts 22 and 23 are driven by the intermediate shaft 45 at an increased speed by way of a third chain 47.

Figure 2:
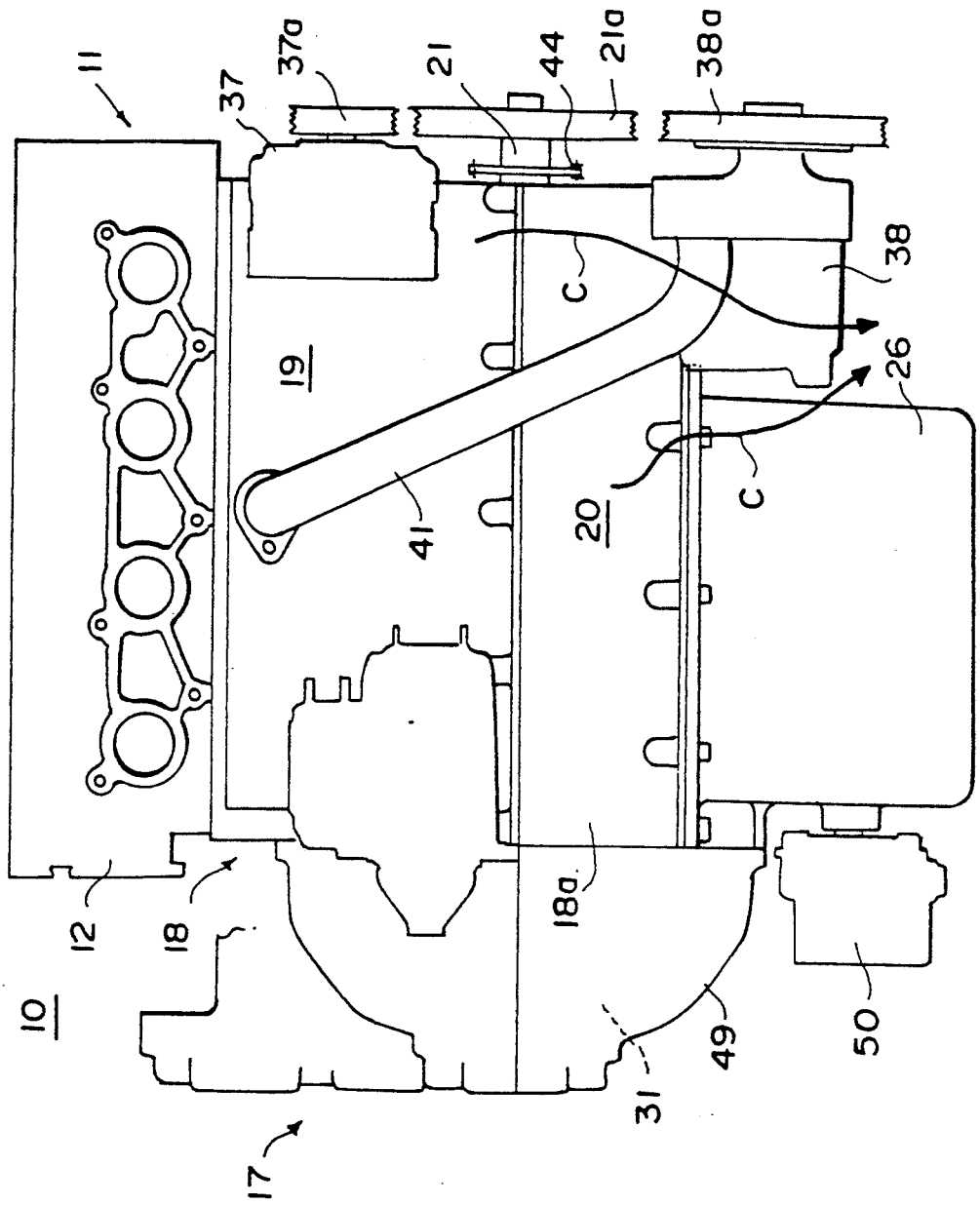
FIG. 2 is a schematic front view as viewed obliquely from upward.

As shown in FIG. 2, the clutch 31 is housed in a clutch housing 49, and an oil pump 50 for a power steering is disposed below the clutch housing 49 and on the side of the oil pan 26.

An auxiliary mechanism driving shaft 51 extends inside the oil pan 26 and projects outside the oil pan 26 at the left side (as seen in FIG. 2) of the oil pan 26. The auxiliary mechanism driving shaft 51 is connected to an oil pump for lubrication of the engine 11 inside the oil pan 26 (though not shown in FIG. 3) and to the oil pump 50 for the power steering outside the oil pan 26. The auxiliary mechanism driving shaft 51 is driven by the crankshaft 21 by way of gears and a chain inside the oil pan 26 and drives the oil pumps.

In the first embodiment of the present invention, engine oil for lubricating various parts in the engine 11 such as the piston, the bearing portions 27 of the crankshaft 21 and the like and transmission oil for lubricating various parts in the transmission 15 and the differential 16 of the power train 17 such as the shafts and the gears are both stored in the oil pan 26. The engine oil and the transmission oil may be the same oil, and by using the oil pan 26 for both the engine oil and the transmission oil, the number of the parts can be reduced, the structure of the engine unit can be simplified and the assembly of the engine unit can be facilitated.

The airflow introduced from the front of the vehicle during running impinges upon the front side of the engine unit 10 to cool it. A part of the airflow is guided by the water pump 38, the compressor 39 and the pulleys 38a and 39a to impinge upon the transmission casing portion 18b behind the crank casing portion 18a passing the side of the oil pan 26 as shown by arrows C in FIGS. 1 to 3, whereby the power train 17 is effectively cooled. Further by changing the depth of the oil pan 26 so as to conform to the slant of the engine 11, the overall height of the engine 11 can be reduced while ensuring the required volume of the oil pan 26.

When the air conditioner compressor 39 is directly mounted on the engine casing 18 at a portion which is substantially at the middle between the crankshaft 21 and the drive shafts 25 so that the air conditioner compressor 39, the crankshaft 21 and the drive shafts 25 are disposed at apexes of a triangle, the cross-sectional rigidity of the portion on which a node of vibration of the differential 16 falls can be maximized, and deterioration in the vibration properties due to bending vibration during operation of the engine, deterioration in reliability due to deformation of the bearings, and the like can be suppressed by the use of the rigidity of the auxiliary mechanisms.

Further, in the first embodiment, since the main body of the engine 11 is disposed above the mating face of the engine housing 18 and the auxiliary mechanisms 37 to 39 are disposed below the main body of the engine 11 and on the side of the engine opposite to the power train 17, the weight of the power train 17 on the rear side of the engine 11 is balanced by the weight of the auxiliary mechanisms 37 to 39 on the front side of the engine 11, thereby suppressing offset of the center of gravity of the engine unit 10, and at the same time, the center of gravity of the engine unit 10 is lowered, whereby vibration of the engine 11 and noises can be suppressed. Further since the belt 36 for driving the auxiliary mechanisms 37 to 39 is laid out not to cross the chains 46 and 47 for driving the maim mechanisms of the engine 11, the overall length of the engine unit 10 in the transverse direction of the vehicle body can be reduced without interference of the belt 36 with the chains 46 and 47.

Figure 5:
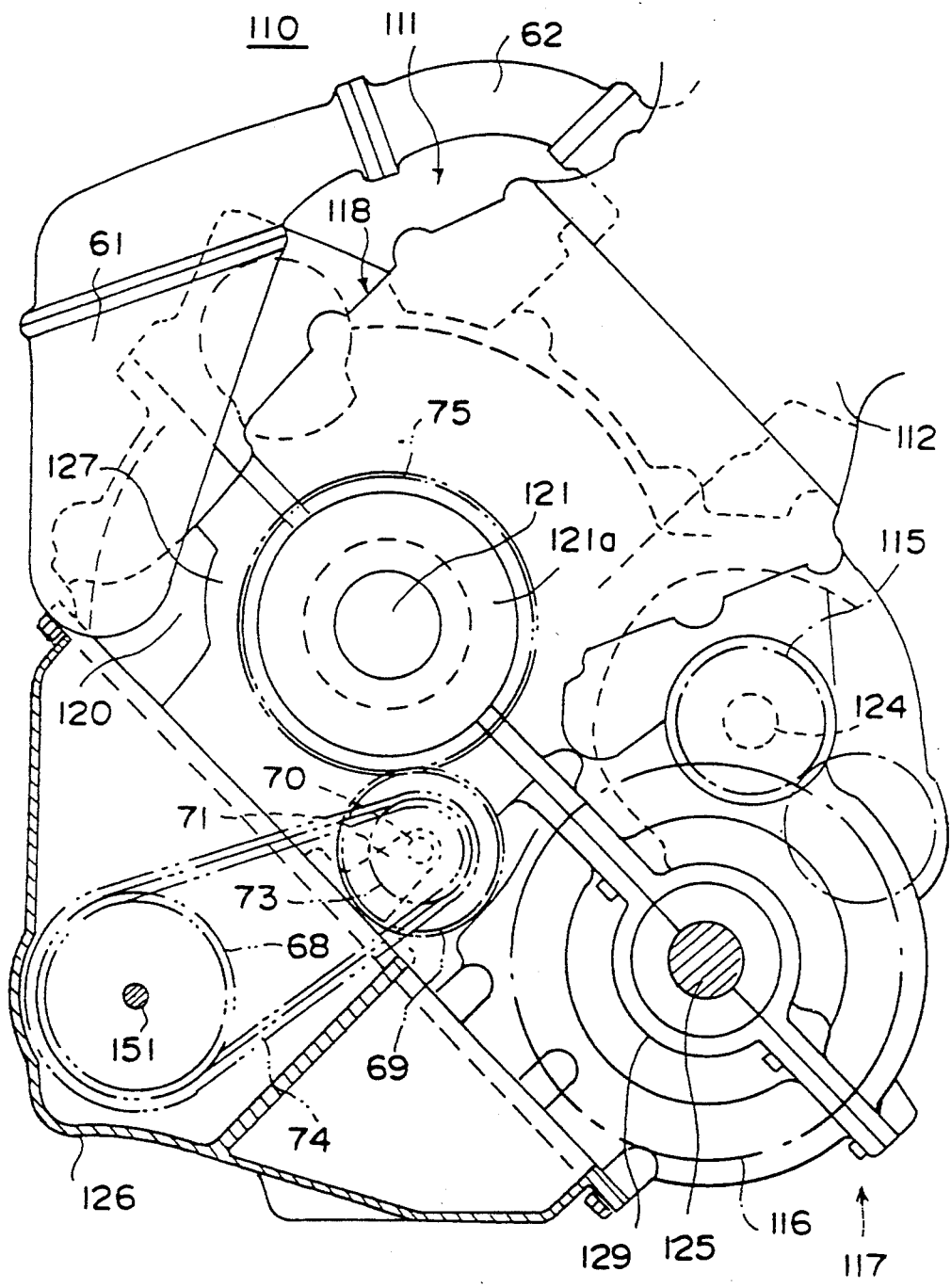
FIG. 5 is a schematic side view partly in cross-section showing a second embodiment of the present invention.
Figure 6:
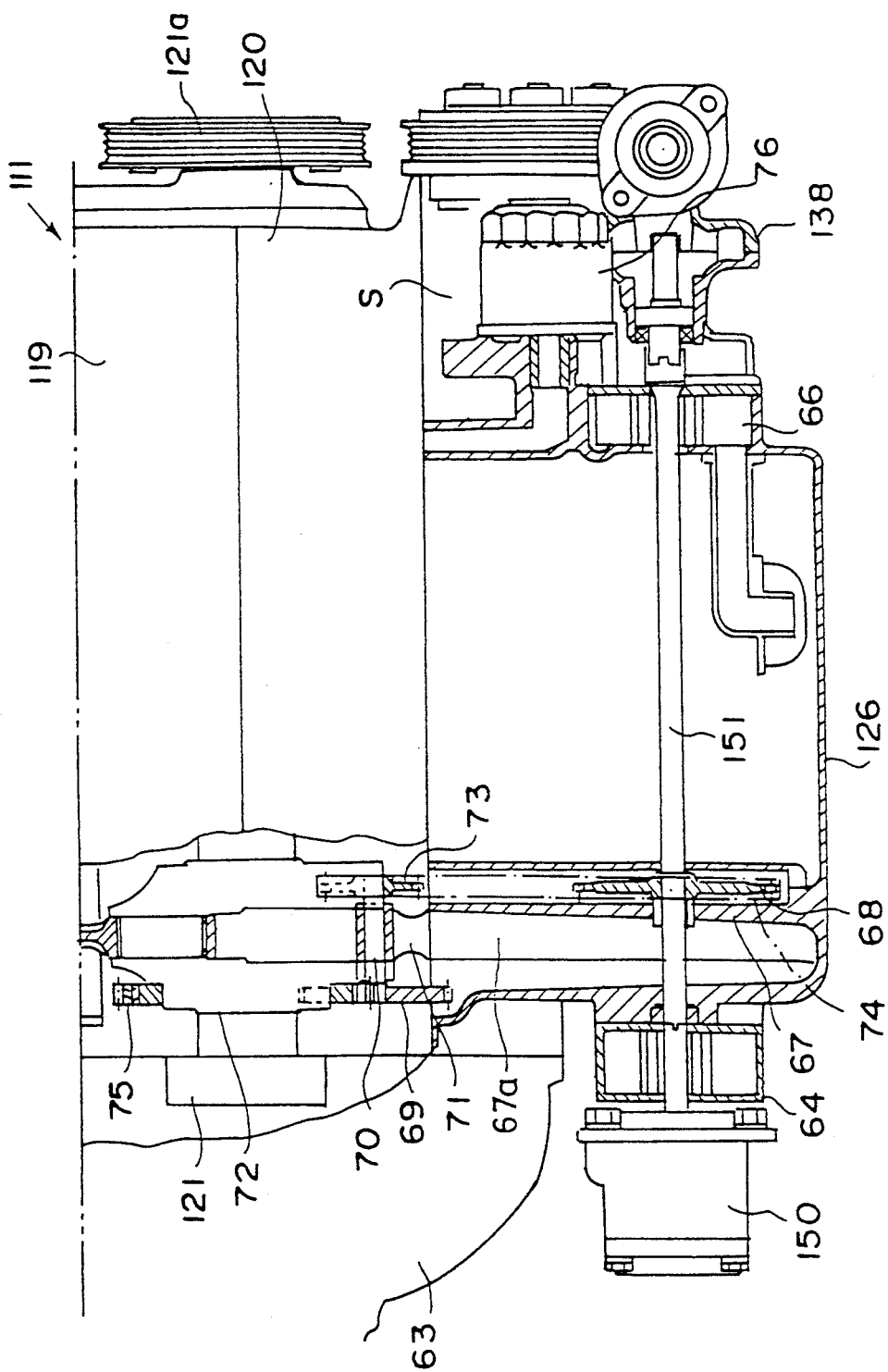
FIG. 6 is a front view partly in cross-section of the second embodiment.
Figure 7:
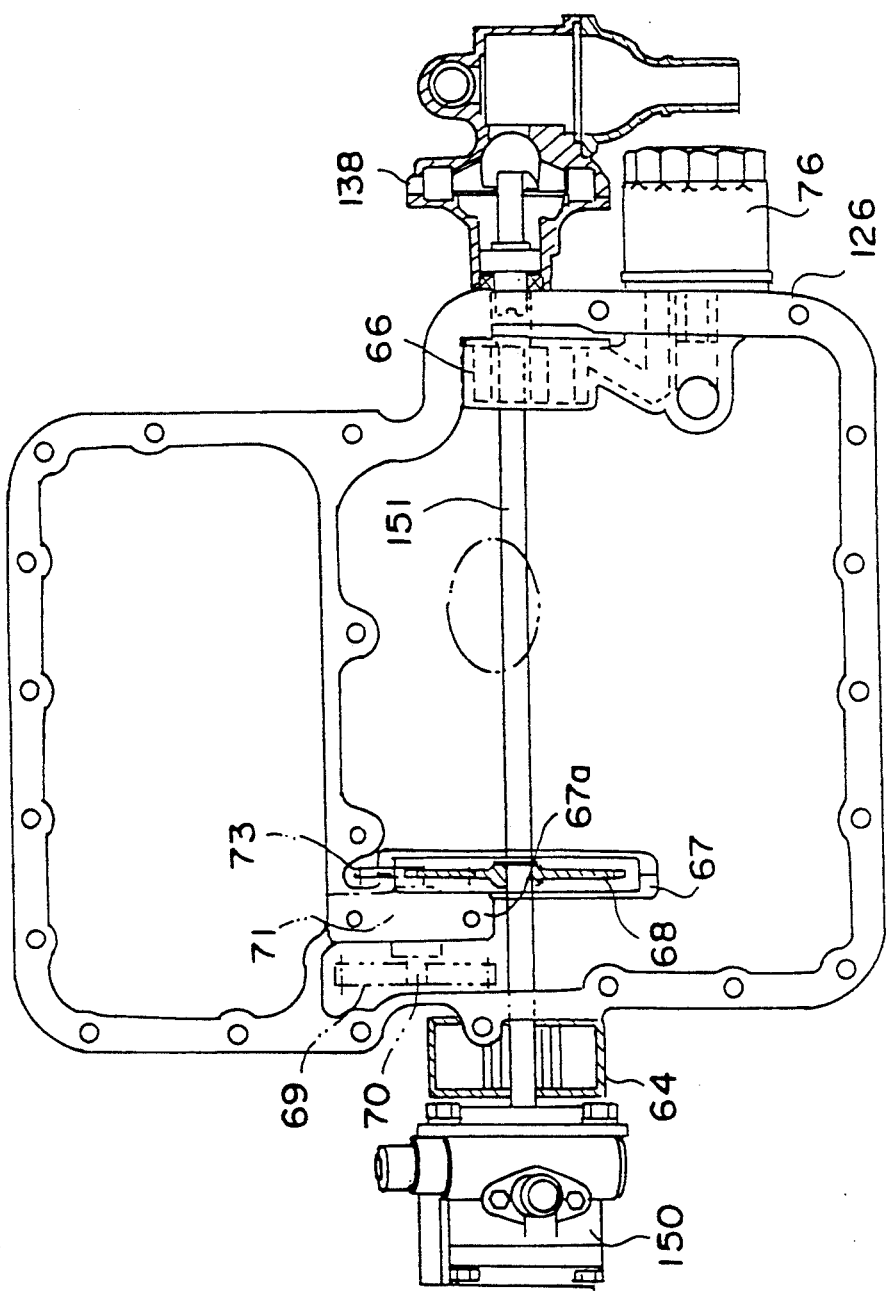
FIG. 7 is a plan view showing the oil pan and the auxiliary mechanism driving system of the second embodiment.

An engine unit 110 in accordance with a second embodiment of the present invention will be described with reference to FIGS. 5 to 7, hereinbelow. In FIGS. 5 to 7, the parts analogous to those shown in FIGS. 1 to 4 are given reference numerals obtained by adding 100 to the reference numerals given in FIGS. 1 to 4.

In FIGS. 5 to 7, the engine unit 110 is mounted sideways in the front of a vehicle body (not shown) with the left side in FIG. 5 facing forward and drives the front wheels (not shown) of the vehicle. The engine unit 110 includes a four-cylinder in-line engine 111 having a cylinder head 112 and a power train 117 comprising a transmission 115 and a differential 116. The engine 111 and the power train 117 are housed in one engine housing 118. The engine 111 has a crankshaft 121 having a crank pulley 121a at one end and extending in the transverse direction of the vehicle body. The upper portion of the engine 11 is slanted rearward of the vehicle body with respect to the vertical plane including the longitudinal axis of the crankshaft 121. A transmission shaft 124 and drive shafts (differential shafts) 125 which extend in opposite directions from the differential 116 are disposed in parallel to the crankshaft 121 on the rear side of the engine 111.

The engine housing 118 is linearly divided into a main housing 119 and a lower housing 120 along a plane passing through the axis of the crankshaft 121. An oil pan 126 of an integral structure is mounted on the lower side of the lower housing 120. Bearing portions 127 for supporting the crankshaft 121 are formed in the mating surfaces of the main housing 19 and the lower housing 20. Further, bearing portions 129 for supporting the drive shafts 125 are formed in the mating surfaces of the main housing 119 and the lower housing 120 on the rear side of the bearing portions 127. A surge tank 61 is provided in the vicinity of the lower housing 120 on the side of the engine 111 opposite to the transmission 115, and an intake pipe 62 is curved upward and connected to the cylinder head 112.

As shown in FIG. 5, the oil pan 126 is formed so as to fill the space which is substantially triangle in shape as viewed in the axial direction of the crankshaft 121 and is formed by rearward slant of the engine 111. As clearly shown in FIG. 6, in the longitudinal direction of the engine 111, the oil pan 126 extends from a position near a torque convertor housing 63 to a position a predetermined distance short of the front edge (the right edge in FIG. 6) of the lower housing 120, and extends over the entire length of the transmission 115 on the transmission side. Thus a space S is formed below the lower housing 120 adjacent to the front edge of the oil pan 126.

An auxiliary mechanism driving shaft 151 extends through the oil pan 126 in parallel to the crankshaft 121 at the engine side portion of the oil pan 126. An oil pump 64 for an automatic transmission is disposed below the torque convertor housing 63 in the vicinity of the oil pan 126 on the rear side (the left side in FIG. 6) of the engine 111, and an oil pump 150 for a power steering is disposed on the outer side of the oil pump 64 for the automatic transmission. The pumps 64 and 150 are connected in series on one end portion of the auxiliary mechanism driving shaft 151. Further an water pump 138 is disposed in the space S on the front side (the right side end in FIG. 6) of the oil pan 126 and is connected to the other end portion of the auxiliary mechanism driving shaft 151. An oil pump 66 for engine lubrication is disposed in the oil pan 126 near the wall facing the water pump 138 and is connected to the auxiliary mechanism driving shaft 151.

Since the auxiliary mechanism driving shaft 151 is disposed on the engine side of the oil pan 126, that is, the auxiliary mechanism driving shaft 151 is in a position which is opposite to the upper portion of the engine with respect to the vertical plane including the longitudinal axis of the crankshaft 121 and in which it serves to lower the center of gravity of the engine unit 110, the offset of the engine unit 110 due to slant of the engine 111 is compensated for and the center of gravity of the engine unit 110 is lowered by weight of the auxiliary mechanisms 64, 66, 138 and 150 on the auxiliary mechanism driving shaft 151.

A box-like wall 67 is formed in the oil pan 126 near the side wall remote from the oil pump 66 for engine lubrication and the auxiliary mechanism driving shaft 151 extends through the box-like wall 67 and a driven sprocket 68 is mounted on the auxiliary mechanism driving shaft 151 in the box-like wall 67. An extension 67a of the box-like wall 67 is formed in the oil pan 126 at a portion of the box-like wall 67 near the transmission 115 and the rear end of the engine 111, and a support member 71 for supporting for rotation a shaft 70 of an idle gear 69 is fixed to the upper end surface of the extension 67a. The idle gear 69 is disposed in a position opposed to an eighth web 72 on the rear end portion of the crankshaft 121, and a driving sprocket 73 is fixed to the shaft 70 of the idle gear 69.

The driven and driving sprockets 68 and 73 are connected with each other by a chain 74. A power output gear 75 is provided on the crankshaft 121 at the portion of the eighth web 72, and is in mesh with the idle gear 69.

The engine output power output through the power output gear 75 is transmitted to the auxiliary mechanism driving shaft 151 through the idle gear 69, the driving sprocket 73, the chain 74 and the driven sprocket 68. Thus the oil pumps 64 for the automatic transmission 64, the oil pump 150 for the power steering, the water pump 138 and the oil pump 66 for engine lubrication are driven. Reference numeral 74 in FIGS. 6 and 7 denotes an oil filter.

In the engine unit of the second embodiment, the auxiliary mechanisms can be compactly arranged by the use of the space S formed adjacent to one end of the oil pan 126, and at the same time, offset of the weight of the engine unit 110 can be corrected by such an arrangement of the auxiliary mechanisms.

Figure 8:
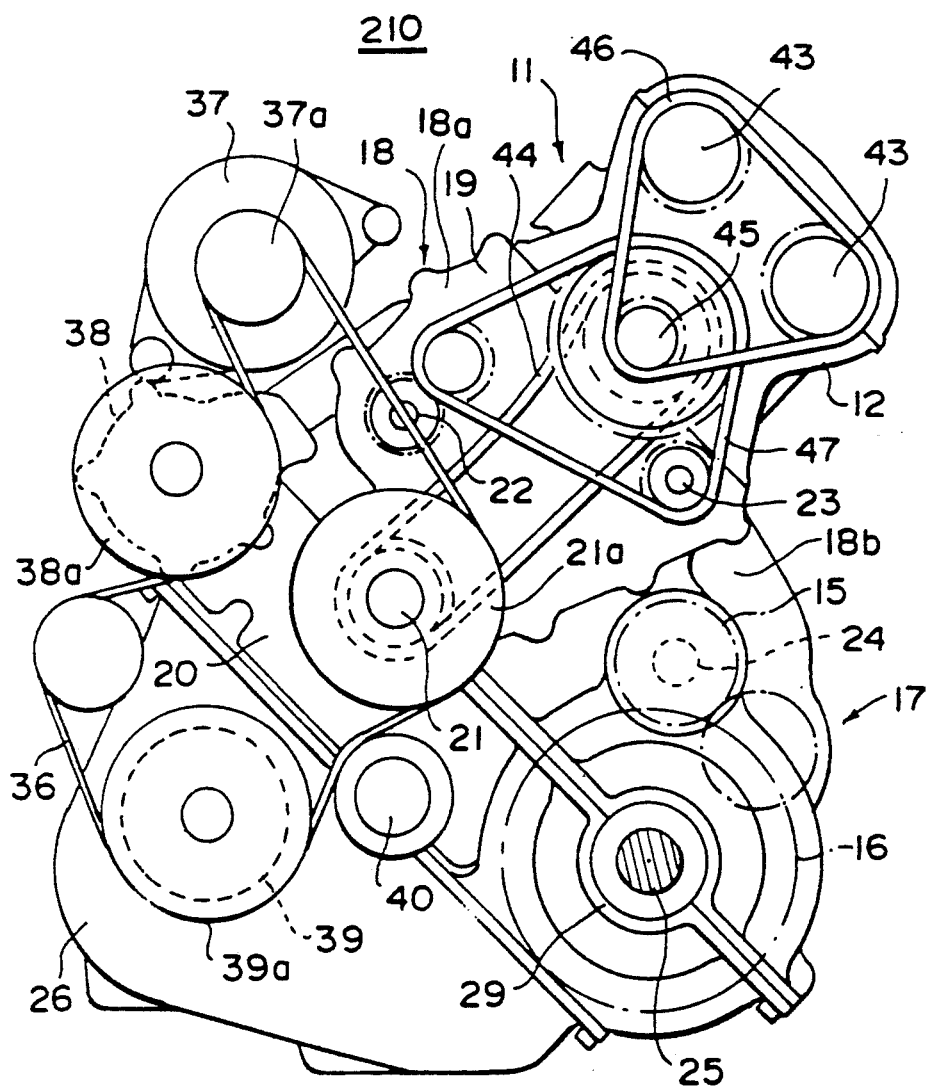
FIGS. 8 to 10 are views similar to FIG. 1 but respectively showing third to fifth embodiments of the present invention.

An engine unit 210 in accordance with a third embodiment of the present invention will described with reference to FIG. 8, hereinbelow.

The engine unit 210 of the third embodiment is substantially the same as the engine unit 10 of the first embodiment and the former differs from the latter mainly in the arrangement of the auxiliary mechanisms. In FIG. 8, the parts analogous to those shown in FIGS. 1 to 4 are given the same reference numerals and will not be described here.

In contrast with the first embodiment where the air conditioner compressor 39 is disposed just below the crankshaft 21 substantially at the middle of the overall engine unit, in the third embodiment, the air conditioner compressor 39 is also disposed on the side of the engine 11 opposite to the power train 17. On this account, the alternator 37 and the water pump 38 are disposed upward. That is, the alternator 37, the water pump 38 and the air conditioner compressor 39 are vertically arranged in this order from top on the front side of the crankshaft 21. The manner of passing the belt 36 is changed according to the change in arrangement of the auxiliary mechanisms.

In this embodiment, the weight in the front of the engine unit is larger than in the first embodiment and the weight in the front of the engine unit is better balanced with the weight of the power train 17 though the center of gravity is slightly higher than in the first embodiment.

Figure 9:
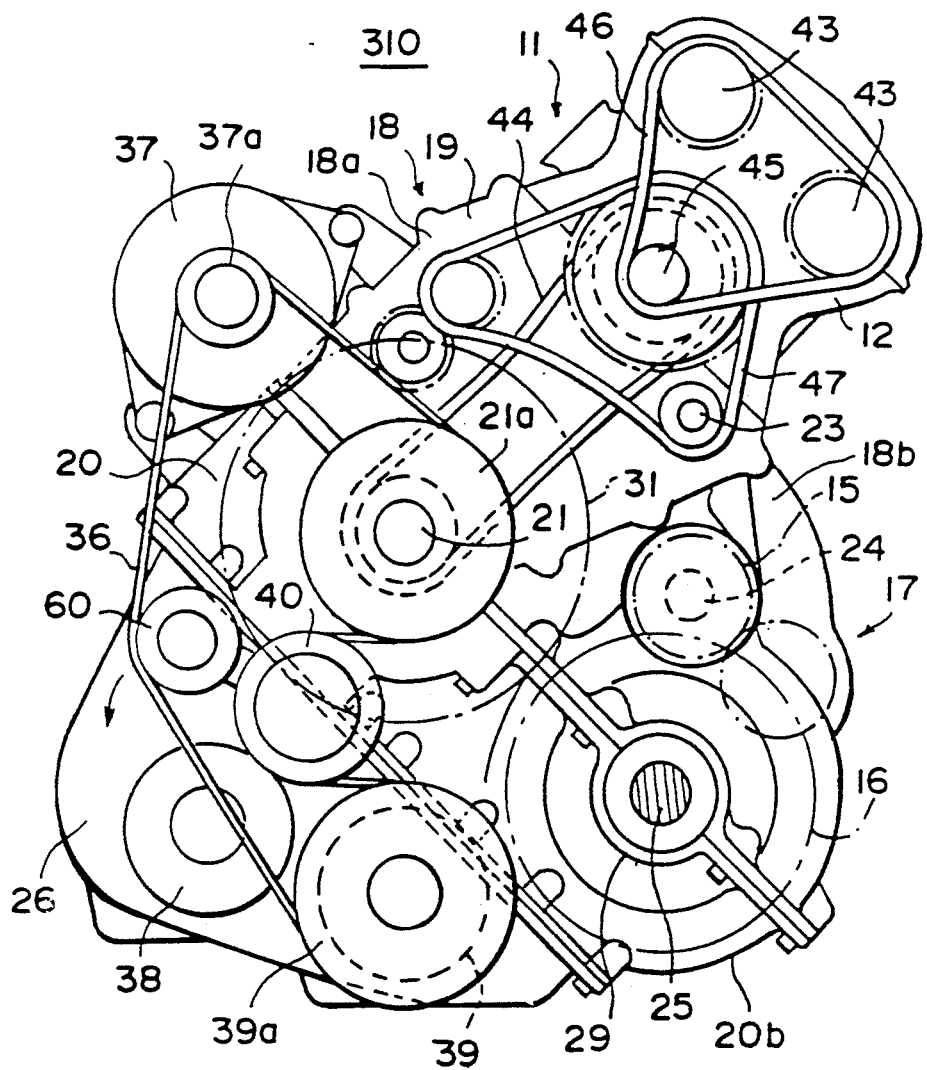

An engine unit 310 in accordance with a fourth embodiment of the present invention will described with reference to FIG. 9, hereinbelow.

The engine unit 310 of the fourth embodiment is substantially the same as the engine unit 10 of the first embodiment and the former differs from the latter mainly in that the water pump 38 is not driven by the belt 36, a tensioner 60 is provided and the positions of the alternator 37 and the air conditioner compressor 39. In FIG. 9, the parts analogous to those shown in FIGS. 1 to 4 are given the same reference numerals and will not be described here.

In the fourth embodiment, the air conditioner compressor 39 is disposed below the power train 17, and the alternator 37 is disposed on the side of the crankshaft 21 opposite to the air conditioner compressor 39. By disposing the alternator 37 and the compressor 39 at a long distance from each other, pulsation of the compressor 39 can be absorbed by resiliency of the belt 36 and the belt 36 can be prevented from being subjected to excessively heavy load, thereby improving reliability of the belt 36.

Further, by virtue of a tensioner 60 which is supported for rotation on the idler 40 between the crankshaft 21 and the compressor 39 and imparts tension to the belt 36 in the direction of the arrow downstream of the compressor 39, pulsation generated by the compressor 39 is effectively absorbed.

In this embodiment, the water pump 38 is driven by the driving mechanism for driving the oil pump 50 (FIG. 2).

Figure 10:
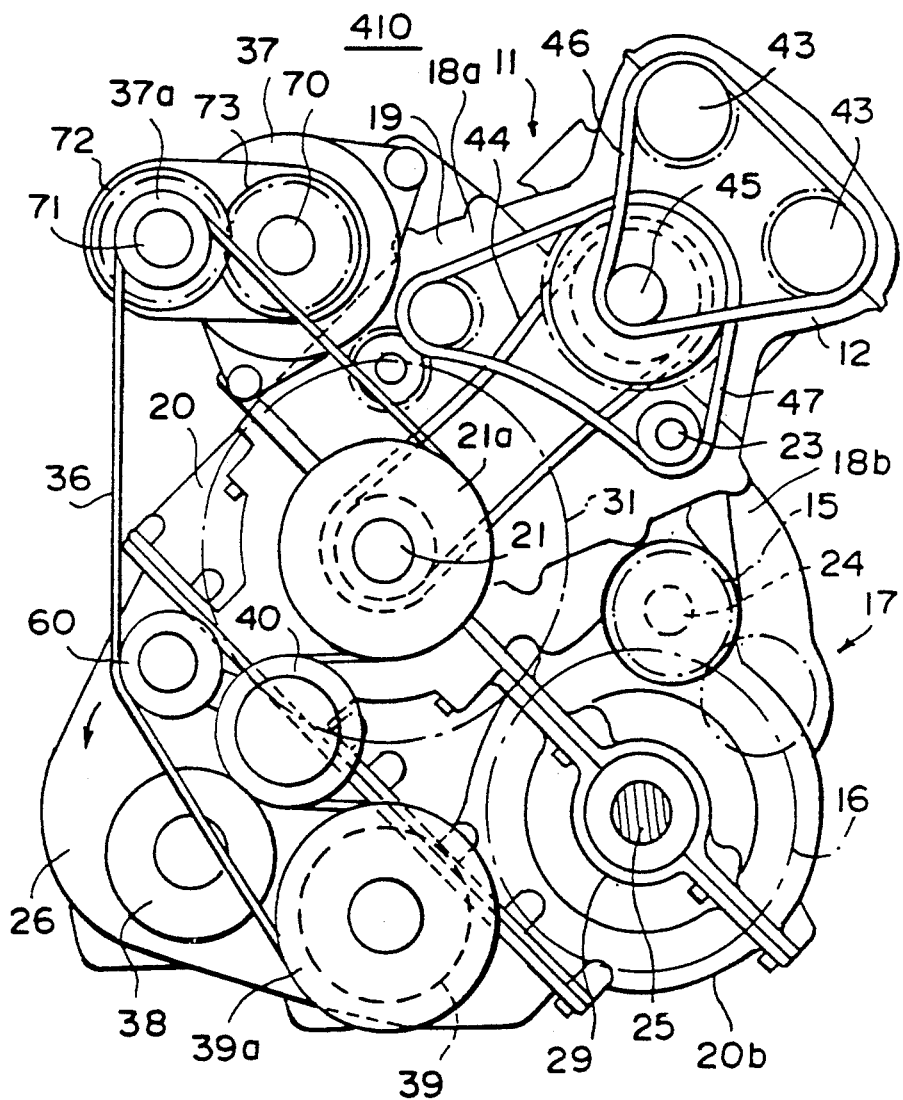

An engine unit 410 in accordance with a fifth embodiment of the present invention will described with reference to FIG. 10, hereinbelow.

The engine unit 410 of the fifth embodiment is substantially the same as the engine unit 310 of the fourth embodiment and the former differs from the latter mainly in the arrangement and the structure of the alternator.

That is, in this embodiment, the alternator 137 has a driven shaft 170 and a pulley shaft 171, and a pulley 137a is fixed to the pulley shaft 171. The belt 36 is passed around the pulley 137a. The pulley shaft 171 is disposed on the side of the driven shaft 170 opposite to the crankshaft 21 and the compressor 39. The pulley shaft 171 is connected to the driven shaft 170 by way of speed increase gears 172 and 173 which are respectively fixed to the pulley shaft 171 and the driven shaft 170 and are larger than the pulley 137a in diameter.

With this arrangement, the distance between the pulley of the alternator and the crankshaft 21 can be larger than that in the fourth embodiment and accordingly the angle of contact between the pulley and the belt 36 may be larger. Further since the distance between the pulley of the alternator and the compressor 39 is larger, the pulsation can be more effectively absorbed by the belt 36. Further by virtue of the speed increase gears 172 and 173, the driven shaft 170 is rotated at a speed higher than that of the pulley shaft 171, whereby a required speed of the alternator 137 can be obtained.

An engine unit 510 in accordance with a sixth embodiment of the present invention will be described with reference to FIG. 11, hereinbelow.

The engine unit 510 of this embodiment is very similar to the engine unit 110 of the second embodiment, and accordingly the difference therebetween will be mainly described here.

In this embodiment, a surge tank 206 is provided on the front side of the engine 211 near a lower block 205 which forms a skirt portion of the cylinder block of the engine 211, and an intake manifold 207 which connects the surge tank 206 to the respective cylinders is curved upward and connected to a cylinder head 208.

An exhaust manifold 225 is connected to the cylinder head 208 from the rear. Fuel injection valves 227 are mounted on the cylinder head 208 to inject fuel into the intake passages 226 in the cylinder head 208 from above. Since the intake manifold 207 which connect the surge tank 206 and the cylinder head 208 is curved upward and accordingly, the highest point in the intake system is at an intermediate portion of the intake manifold 207, the fuel injected from the fuel injection valves 227 which are mounted in a position shifted toward the engine from the intake manifold 207 cannot flow into the surge tank 206. Though, in this embodiment, the fuel injection valves 227 are mounted on the cylinder head 208, the fuel injection valves 227 may be mounted on the intake manifold 207 so long as they are on the side of the highest point nearer to the engine 211. Reference numeral 230 in FIG. 11 denotes a radiator.

Figure 11:
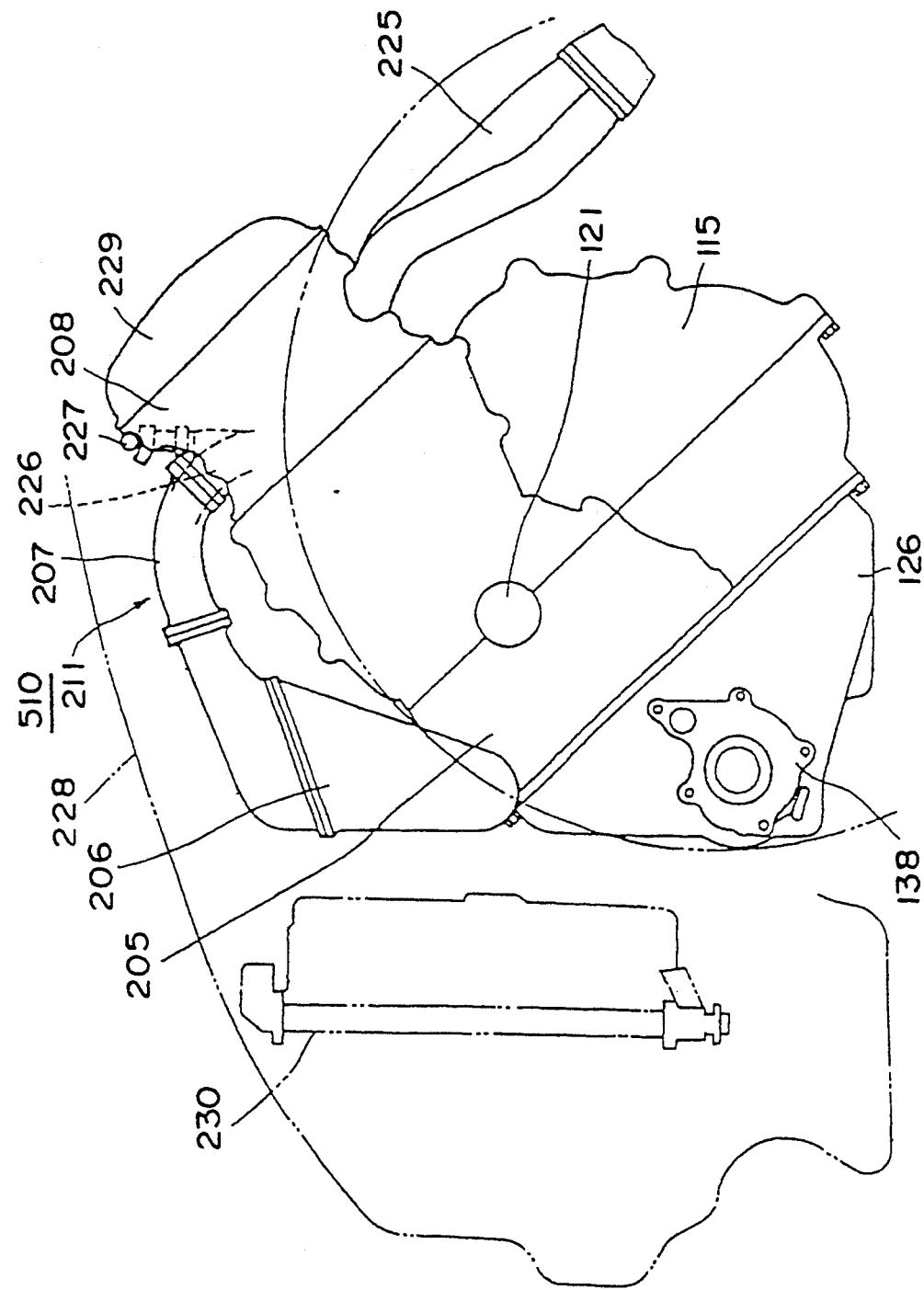
FIG. 11 is a schematic side view of en engine unit in accordance with a sixth embodiment of the present invention as viewed from the left side of the engine unit.

In this embodiment, since the surge tank 206 is disposed low on the front side of the engine 211 and the intake manifold 207 is curved upward from the surge tank 206, the engine hood line 228 can be determined on the basis of the height of the radiator 230 and the head cover 229 without limited by the intake system and may be relatively low as shown in FIG. 11. Further since the auxiliary mechanisms are disposed on the side of the oil pan 126, also the size of the engine unit 510 in the longitudinal direction of the vehicle body can be small.

What is claimed is:

1. An engine unit comprising an engine and a transmission mounted on a vehicle body substantially parallel to one another and transverse to a longitudinal direction of the vehicle body with the transmission disposed on a rear side of the engine in the longitudinal direction of the vehicle body;

a unitary engine housing for housing the engine and the transmission, an oil pan common to the engine and the transmission mounted on a lower side of the unitary engine housing below the engine and the transmission, said oil pan being in communication with both the engine and the transmission, a length of the oil pan in the traverse direction of the vehicle body being smaller than the unitary engine housing, and an auxiliary mechanism disposed in a space on one side of the oil pan and below the unitary engine housing.

2. An engine unit as defined in claim 1 in which a differential is disposed on the rear side of the engine.

3. An engine unit as defined in claim 1 in which said engine is slanted rearward and the oil pan is substantially triangular in cross-section.

4. An engine unit as defined in claim 1 in which an auxiliary driving shaft extends through the oil pan in the transverse direction of the vehicle body and an auxiliary mechanism is connected to each end of the auxiliary mechanism driving shaft.

5. An engine unit as defined in claim 4 in which the auxiliary mechanism driving shaft extends through a box-like wall formed in the oil pan near one side wall thereof and a driven sprocket is mounted on the auxiliary mechanism driving shaft in the box-like wall, the driven sprocket being connected to the crankshaft of the engine by way of a driving sprocket and a chain.

6. An engine unit as defined in claim 4 in which an oil pump for an automatic transmission and an oil pump for a power steering is connected to one end portion of the auxiliary mechanism driving shaft in series with each other and a water pump is connected to the other end of the auxiliary mechanism driving shaft.

7. An engine unit as defined in claim 4 in which said engine housing is linearly divided into a main housing and a lower housing along a plane passing through the axis of the crankshaft of the engine and said oil pan is mounted on the lower side of the lower housing, bearing portions for supporting the crankshaft being formed in the mating surfaces of the main housing and the lower housing and bearing portions for supporting drive shafts being formed in the mating surfaces of the main housing and the lower housing on the rear side of the bearing portions for supporting the crankshaft.

8. An engine unit as defined in claim 4 in which a surge tank of an intake system is provided on the front side of the engine near a skirt portion of the engine block, an intake manifold for connecting the surge tank to the cylinder head of the engine is curved upward from the surge tank and is connected to the cylinder head, and an exhaust manifold is connected to the cylinder head from the rear side of the engine.

9. An engine unit as defined in claim 1 in which said unitary engine housing is linearly divided into a main housing and a lower housing along a plane passing through an axis of a crankshaft of the engine and said oil pan is mounted on a lower side of the lower housing, bearing portions for supporting the crankshaft are formed in mating surfaces of the main housing and the lower housing on the rear side of the bearing portions for supporting the crankshaft.

10. An engine unit as defined in claim 1 in which a surge tank of an intake system is provided on the front side of the engine near a skirt portion of the engine block, an intake manifold for connecting the surge tank to the cylinder head of the engine is curved upward from the surge tank and is connected to the cylinder head, and an exhaust manifold is connected to the cylinder head from the rear side of the engine.

11. An engine unit as defined in claim 1 in which said auxiliary mechanism includes an alternator and a water pump, with the alternator being disposed on an upper front of the unitary engine housing and the water pump being disposed on a lower front side of the unitary engine housing, and a compressor for an air conditioner is disposed below the unitary engine housing at a middle thereof, the alternator, the water pump and the compressor respectively having pulleys and being driven by a driving belt passed around the pulleys and a crank pulley fixed to the crankshaft of the engine.

12. An engine unit as defined in claim in which a drive shaft is connected to the transmission in parallel with a crankshaft of the engine and a power generating portion of the engine is disposed above a line passing through the crankshaft and the drive shaft while the auxiliary mechanism is disposed below the power generating portion of the engine and on a front side of the engine.

13. An engine unit as defined in claim 1 in which a portion of the unitary engine housing in which the transmission is housed extends in the transverse direction of the vehicle body beyond one side edge of the oil pan.

14. An engine unit as defined in claim 9, further comprising a belt operatively associated with said auxiliary mechanism and said crankshaft wherein said auxiliary mechanism is driven by said belt.

* * * * *